3,318,802
HYDROCRACKING PROCESS EMPLOYING A CRYSTALLINE ALUMINO-SILICATE ACTIVATED WITH A CHLORINE COMPOUND
Homer Z. Martin, Westfield, N.J., assignor to Esso Research and Engineering Company, a corporation of Delaware
No Drawing. Filed Jan. 21, 1965, Ser. No. 427,125
13 Claims. (Cl. 208—111)

This invention relates to an improved hydrocracking process wherein hydrocarbons are hydrocracked in the presence of hydrogen and a catalyst comprising a crystalline alumino-silicate zeolite containing a platinum group metal. Particularly, the invention relates to an improved means for increasing the activity of said catalyst by the introduction of a halogen-containing compound into the hydrocracking zone.

Hydrocracking has recently become a subject of considerable interest within the petroleum industry because of certain particularized advantages it offers over conventional catalytic cracking processes. It is most generally applied to the treatment of hydrocarbons in the range of heavy naphtha and gas oil, although it may be employed also for upgrading heavy gas oils and even higher boiling feedstocks by converting them to lower boiling gas oil fractions or to gasoline. It may also be applied to virgin naphtha, catalytic naphthas, gas oils, cycle oils and fractions obtained from conventional petroleum cracking operations that boil in the gas oil range. The process is also of interest in converting alkylated aromatic fractions to lower-boiling alkyl aromatic hydrocarbons as well as to totally dealkylated aromatics. The hydrocracking process is generally carried out at temperatures of from about 450° to 1000° F., typically 450° to 750° F.; pressures of from about 200 to about 3000 p.s.i.g., typically 1000 to 2000 p.s.i.g.; liquid hourly space velocities of from about 0.1 to about 10, preferably 0.5 to 3 volumes of feed per volume of catalyst per hour; and hydrogen rates of from about 1000 to about 25,000, preferably 2000 to 12,000, s.c.f. per barrel of feed.

Recently, a markedly improved hydrocracking catalyst has been developed which comprises a crystalline aluminosilicate zeolite having a platinum group metal deposited thereon or incorporated therein. This catalyst has been found to exhibit relatively high activity and activity maintenance, even in the presence of substantial quantities of organic nitrogen. It has particularly been found that the crystalline alumino-silicate zeolites having uniform pore openings of about 6 to 15 A. when composited with the platinum group metal, and more particularly after base exchange to reduce the alkali metal oxide, e.g. $Na_2O$, content of the zeolite component to less than about 10 wt. percent, are highly efficient hydrocracking catalysts.

While the above-described crystalline alumino-silicate zeolite catalysts have proven to be quite beneficial in hydrocracking processes, it will be appreciated that there is a constant need for improving their activity and useful life. It has now been discovered that the catalytic activity of the aforementioned crystalline zeolite hydrocracking catalyst can be substantially improved by the inclusion of halogens or halogen-containing compounds in the hydrocarbon feed, or by their introduction directly into the hydrocracking zone concurrently with the feed. Additionally, by means of this technique, the requisite hydrocracking temperatures are reduced thereby enabling a reduction in the heat requirements of the hydrocracking reaction. Furthermore, these lower temperatures cause a lower crystallinity loss of the zeolite support, thereby extending its useful life.

In brief compass, therefor, the present invention provides an effective means for both increasing and maintaining the activity of crystalline alumino-silicate zeolite catalysts by the introduction of a halogen material either into the hydrocracking feed stream or directly into the hydrocracking zone. Without being limited to any particular mechanism or theory, it is believed that this activity improvement is caused by the conversion of the halogens and halogen-containing compounds to the corresponding hydrogen halides at hydrocracking conditions, which halides increase the activity of the crystalline zeolite support.

Suitable halogen-containing materials for the purposes of the invention will include free halogen, e.g. chlorine, the hydrogen halides, e.g. hydrogen chloride, and hydrogen halide precursors; i.e. halogen compounds of the type that readily decomposes or reacts with hydrogen to form hydrogen halides at hydrocracking conditions. The halogen-containing compounds should also be of the type that will not tend to poison the catalyst. In addition to the hydrogen halides, preferred halogen-containing compounds will include the organic halides such as alkyl and aryl mono- and polyhalides, as well as halogenated acids, aldehydes, ketones, etc. Suitable alkyl halides will, for example, include methyl chloride, ethyl chloride, etc. Preferred organic halides will be those having a relatively high halogen content such as a tetrahalide, e.g. carbon tetrachloride, etc.; or a trihalide, e.g. chloroform, tertiary butyl chloride; or other polyhalide compounds such as perchloroethane, etc. Generally, about 100 to 10,000 p.p.m. of halogen, preferably 1000 to 5000 p.p.m., will be introduced either into the feed or directly into the hydrocracking zone. Optimum hydrocracking conditions when alkyl halides are utilized will include 450° to 750° F., 800 to 2000 p.s.i., and 3000 to 12,000 s.c.f. of hydrogen per barrel.

The crystalline alumino-silicate zeolites employed as the catalyst support in the present invention will have the following chemical formula in the anhydrous form expressed in terms of moles:

$$0.9 \pm 0.2 M_{2/n}O \cdot Al_2O_3 \cdot xSiO_2$$

In the above formula, M is selected from the group consisting of metal cations and hydrogen, $n$ is the valence of M, and $x$ is a number in the range of from about 1 to about 10. Most useful are those zeolites in which $x$ is in the range of from about 3 to about 6.5. Usually, the zeolite as prepared will contain a substantial proportion of an alkali metal as M in the above formula. Preferred crystalline zeolites for use as hydrocracking catalyst bases in the invention will have been base-exchanged so that the alkali metal oxide, e.g. sodium, represents a minor molar proportion of the metal represented as M. Preferably, the sodium content is reduced below 10 wt. percent based on the zeolite, more preferably below 5 wt. percent.

Crystalline alumino-silicate zeolites having uniform pore openings in the range of from about 6 A. to about 15 A. and varying silica to alumina ratios may be prepared by any of the methods known in the art, which involve the reaction of the proper amounts and ratios of silica, alumina and sodium hydroxide. Alumina may be supplied in the form of sodium aluminate or an alumina sol or the like, silica may be supplied in the form of sodium silicate and/or silica gel and/or a silica sol, and alkali may be furnished by an alkaline hydroxide, as for example sodium hydroxide, either as such or in combination with sodium aluminate and/or sodium silicate. As taught in the prior art, careful control should be kept over the pH, the sodium ion concentration of the mix, and the crystallization period. Suitable processes for preparing molecular sieves in this manner are described, for example, in U.S. Patents 2,882,244 and 2,971,904.

The most common means for removing sodium from the crystalline zeolite is by base exchange with suitable cation solutions. The zeolite may be exchanged with hydrogen-containing cations and cations of metals in Groups I to VIII and rare earth metals, preferably metals in Groups II, III, IV, V, VI–B, VII–B, VIII and the rare earth metals. More than one cation may be introduced by successive exchange treatments. Particularly preferred cations will be hydrogen or hydrogen-containing cations, e.g. ammonium ion, and/or magnesium cations. Examples of other suitable cations are cobalt, nickel, zinc, magnesium, calcium, cadmium, copper and barium cations. The base exchange is accomplished by conventional contact of the crystalline zeolite with a suitable salt solution of the desired cation, such as the sulfate, chloride, nitrate, etc.

The base-exchanged crystalline zeolite is composited with the platinum group metal by treatment with a solution of a platinum group metal salt or ammonium complex, e.g. ammonium chloroplatinate, ammoniacal palladium chloride, etc. The amount of platinum group metal in the finished catalyst is ordinarily between about 0.01 and 5.0 wt. percent, preferably 0.1 to 3.0 wt. percent based on the zeolite. By "platinum group metals" is meant metals in the platinum and palladium series of the Periodic System such as platinum, palladium, rhodium, osmium, iridium, and the like. Palladium will be the preferred platinum group metal in the present invention.

As an additional step in the preparation of the crystalline zeolite catalyst component, the zeolite, either in its original form, after base exchange, or after impregnation with the platinum group metal, is subjected to a calcination at a temperature of from about 400° F. to about 1000° F. for several hours. For example, it may involve 2 hours heating at 400° F. followed by 4 hours at 550° F. followed by a 16-hour treat at 1000° F.

The present invention will be more fully understood by reference to the following examples which are not intended to be limiting.

*Example 1.—Preparation of hydrocracking catalyst*

This example illustrates a typical procedure for preparing a hydrocracking catalyst of the type used in the present invention.

A crystalline alumino-silicate zeolite having a silica to alumina mole ratio of about 5, uniform pore openings of about 13 A., and an X-ray diffraction pattern similar to the mineral faujasite is prepared by reacting sodium hydroxide, alumina, silica, and water, all supplied from suitable source materials, by procedures well known in the art. The zeolite product is then successively converted to the ammonium form and then partially to the magnesium form by conventional ion-exchange procedures. The first ion-exchange step utilizes ammonium hydroxide and ammonium chloride solutions in order to replace about 90 wt. percent of the sodium content of the product with ammonium ion. Subsequent to the ammonium ion exchange the product is treated with magnesium sulfate solution to produce a product containing about 2 wt. percent magnesium. The ammonium-magnesium sieve product is then impregnated with palladium by slurrying the product in water and adding a sufficient quantity of ammoniacal palladium chloride solution to produce about 0.5 wt. percent palladium in the final product. The catalyst is then washed, dried in air, pilled, and finally calcined in air for 16 hours at 1000° F. The product obtained is the hydrogen-magnesium form of the synthetic faujasite type of crystalline zeolite impregnated with palladium, the hydrogen form being produced by liberation of ammonia during the calcination step.

*Example 2.—Hydrocracking with added halogen compound*

A series of hydrocracking runs was performed utilizing a hydrocracking catalyst prepared by a procedure similar to that in Example 1.

A fresh catalyst was charged to reactor 1, and after a short period of operation, the catalyst was regenerated giving a regenerated catalyst of high activity. After a period of operation without chlorine addition, 0.5 vol. percent $CCl_4$ was added to the feed.

In reactor 2 a catalyst was used which had been contacted with steam for 16 hours at 900° F. to produce an artificially deactivated catalyst of low activity. 0.5% $CCl_4$ was periodically added to the feed so that there were alternate periods of chlorine addition and no chlorine addition. Toward the end of the run, the catalyst in reactor 2 was regenerated and tested for hydrocracking activity, both with and without chlorine addition.

All the hydrocracking runs were performed at a pressure of 1200 p.s.i.g., a hydrogen rate of 10,000 s.c.f./b. of feed and at the feed rates and temperatures indicated in Table I. The feed stock employed was a hydrofined light catalytic cycle stock having a gravity of 27.7° API and a nitrogen content of less than 2 p.p.m. In all cases the hydrocracking selectivity remained substantially unaltered by the $CCl_4$ addition.

TABLE I.—HYDROCRACKING OF LIGHT CATALYTIC CYCLE OIL

| Reactor | 1 | | | | | 2 | | | | | | |
|---|---|---|---|---|---|---|---|---|---|---|---|---|
| Catalyst | Fresh | Regenerated | | | | Steamed | | | | | Steamed and Regenerated | |
| Catalyst Age, $V_F/V_C$ [1] | 252 | 637 | 727 | 762 | 798 | 203 | 227 | 302 | 355 | 455 | 514 | 652 |
| Feed, Rate, v./v./hr | 1.55 | 1.48 | 1.52 | 1.51 | 1.51 | 1.02 | 1.00 | 1.58 | 1.57 | 1.60 | 1.62 | 1.63 |
| Temperature, ° F | 479 | 480 | 478 | 485 | 485 | 472 | 487 | 483 | 485 | 488 | 457 | 467 |
| $CCl_4$ in Feed, 0.5 vol. percent | No | No | No | Yes | Yes | No | Yes | Yes | No | Yes | No | Yes |
| Conversion, vol. percent [2] | 56.0 | 45.3 | 43.6 | 79.3 | 78.5 | 6.0 | 57.0 | 31.0 | 10.5 | 37.5 | 12.0 | 37.5 |

[1] Cumulative volumes of feed per volume of catalyst.    [2] Conversion to products boiling below the feed.

The following conclusions may be drawn from the above table:

(1) In reactor 1, which contained a regenerated catalyst of high activity, chlorine addition to the feed resulted in a large increase in conversion; i.e. from about 44% to about 79%. Conversion with chlorine addition was higher than that with fresh catalyst without chlorine addition.

(2) In reactor 2, which contained a catalyst which had been purposely deactivated by steaming, chlorine addition to the feed also showed a large increase in conversion. Conversion levels, both with and without chlorine addition, were lower than the level obtained with the fresh catalyst and the regenerated catalyst of high activity in reactor 1, thus showing that the severe steaming had resulted in catalyst deactivation.

(3) In reactor 2, conversion dropped when chlorine addition was discontinued; however, conversion increased again when chlorine addition was resumed.

(4) In reactor 2, wherein the steamed catalyst was regenerated and the benefits of chlorine addition were again noted, the regenerated steamed catalyst appeared to be somewhat higher in activity as noted by the lower operating temperatures.

It is thus apparent that by means of the present invention, the activity of platinum group metal-impregnated crystalline metallo alumino-silicate catalysts in hydrocracking processes may be improved by the relatively simple expedient of adding a halogen material to the hydrocracking reaction zone.

What is claimed is:

1. An improved process for hydrocracking a hydrocarbon feed which comprises subjecting said feed to hydrocracking conditions in the presence of added hydrogen, an added chlorine-containing compound selected from the group consisting of chlorine, hydrogen chloride, alkyl chloride, aryl chloride, and organic polychlorides whose concentration is maintained within the range of about 1,000 to 5,000 p.p.m. based on the feed and a hydrocracking catalyst comprising a crystalline alumino-silicate zeolite composited with a platinum group metal, said zeolite having a silica/alumina mole ratio in the range of from about 3 to about 6.5, uniform pore openings in the range from about 6 to about 15 A. and which zeolite further has been base exchanged so as to reduce its alkali metal oxide content to below 10 wt. percent.

2. The process of claim 1, wherein said zeolite is composited with 0.01 to 5.0 wt. percent of a platinum group metal.

3. The process of claim 1, wherein said platinum group metal is palladium.

4. The process of claim 1, wherein said alkali metal oxide is $Na_2O$.

5. The process of claim 1, wherein said zeolite has been base exchanged with a hydrogen-containing cation.

6. The process of claim 1, wherein said zeolite has been base exchanged with an alkaline earth metal cation.

7. The process of claim 1, wherein said zeolite has been base exchanged with a cation selected from the group consisting of ammonium cation, magnesium, cation, and a mixture thereof.

8. The process of claim 1, wherein said chlorine-containing compound is carbon tetrachloride.

9. The process of claim 1, wherein said chlorine-containing compound is an alkyl chloride.

10. The process of claim 1, wherein said chlorine-containing compound is hydrogen chloride.

11. The process of claim 1, wherein said chlorine-containing compound is chlorine.

12. In the hydrocracking of a hydrocarbon feed by subjecting said feed to hydrocracking conditions in the presence of added hydrogen and a hydrocracking catalyst comprising a crystalline alumino-silicate zeolite composited with a platinum group metal, said zeolite having a silica/alumina mole ratio in the range from about 3 to about 6.5, uniform pore openings of about 6 to about 15 A. and further having been base exchanged so as to reduce its alkali metal oxide content to below about 10 wt. percent, wherein said hydrocracking catalyst has a tendency to become deactivated, the improved means of restoring said activity which comprises introducing a chlorine-containing compound into the hydrocracking zone, said chlorine-containing compound being selected from the group consisting of chlorine, hydrogen chloride, alkyl chloride, aryl chloride, and organic polychlorides, said chlorine compound being added in an amount sufficient to maintain a concentration of said compound in the range of about 1,000 to about 5,000 p.p.m. based on the feed therein.

13. The process of claim 12, wherein said chlorine-containing compound is chlorine.

References Cited by the Examiner

UNITED STATES PATENTS

| 2,642,384 | 6/1953 | Cox | 208—139 |
| 3,159,564 | 12/1964 | Kelley et al. | 208—59 |
| 3,159,569 | 12/1964 | Hansford | 208—110 |

DELBERT E. GANTZ, *Primary Examiner.*

A. RIMENS, *Assistant Examiner.*